Dec. 19, 1967  C. Y. SIKTBERG  3,358,976
APPARATUS FOR HEATING CONCRETE INGREDIENTS
Filed March 15, 1965

INVENTOR.
CONRAD Y. SIKTBERG

BY Lockwood, Woodard, Smith & Weikart
Attorneys

United States Patent Office 3,358,976
Patented Dec. 19, 1967

3,358,976
APPARATUS FOR HEATING CONCRETE
INGREDIENTS
Conrad Y. Siktberg, 420 S. Berkley Road,
Kokomo, Ind. 46901
Filed Mar. 15, 1965, Ser. No. 439,876
5 Claims. (Cl. 263—29)

ABSTRACT OF THE DISCLOSURE

A method, and the apparatus for carrying it out, for heating the fine and coarse aggregate components of portland cement concrete in the batching plant production of such concrete, the heating taking place only as the components move through the bin discharge gates.

This invention relates generally to proportioning or batching plant production of portland cement concrete and in particular to a structure for heating the components, such as fine and coarse aggregates, which can be installed on conventional bins, and which heats the material only as it approaches the bin discharge gate.

In batching bins of the type referred to, where the discharge gate is at the apex of the tapered, lower portion of the bin, fine materials such as cement or sand flows from the top of the bin contents downwardly through a vertical tube-like space. The top surface of material in the upper portion of the bin assumes an inverted cone shape with the top of the moving column of material directly above the discharge gate being located at the cone apex. As material in the column moves toward the discharge gate, it is replaced by layers of material from the inverted cone-shaped surface of the material at the top of the column. When material is being withdrawn from the bin continuously or at frequent intervals, the material passing through the discharge gate has, just prior to its passage, been lying at the top surface of the bin contents. This top surface of the bin contents has, of course, been exposed to the temperature of the surrounding air and in cold weather, since the bins are normally located outdoors, the material passing through the gate will be quite cold. As each batch is discharged from the storage bin, to a scale hopper for example, the material in the column is replaced by material from the cone shaped surface and a new layer is thus exposed to the chilling effect of direct exposure to the atmosphere. Movement of fine aggregate material from a storage bin can be obstructed by the tendency of the fine material to "arch" or bridge between any obstructions at the discharge gate.

For effective winter operation of concrete batching facilities, the material must be heated. Portland cement hydration, like other chemical reactions, is affected by temperature. If the setting time and resulting finishing time of the concrete is to be controlled, then reasonably close control must be maintained over the temperature of the concrete and therefore of the ingredients as they enter the weigh batcher. Further maximum durability of concrete requires proper amounts of entrained air in the concrete. Other conditions remaining uniform, a difference or change in temperature of a few degrees in concrete being mixed and poured results in a difference or change in the total volume of entrained air in the concrete. In typical winter operation, successive loads of concrete are not batched at evenly spaced time intervals but are, more often, loaded intermittently as the job requires. Loads may follow each other immediately or a substantial time interval may exist between loads. Heating all of the ingredients in the bins so as to maintain the desired temperature is expensive, and because of randomly timed withdrawals, difficult to control. By heating only the material moving within the bin at withdrawal, the concept of the present invention, temperature uniformity can be achieved at minimum heating cost even though time periods of widely varying duration intervene between withdrawals.

The fundamental concept of the present invention, referred to above, is specifically accomplished by removably inserting in the discharge throat of the coarse and fine aggregate bins a structure formed of ported, steam-carrying pipes which inject steam into the aggregate as it moves into the discharge gate. The two pipe structures differ to accommodate the differing pattern of movement through their bins of the coarse and fine materials.

The primary object of the present invention, therefore, is to provide a system for heating bulk components of portland cement concrete only as they move through the bin discharge gate to permit accurate temperature control of the mix even though withdrawals occur at randomly spaced intervals.

A further object of the present invention is to provide a heating structure which can be removably inserted in a conventional bin discharge gate assembly to permit heating of coarse aggregate moving through the gate, the configuration of the structure taking into account the characteristic pattern of movement of the coarse aggregate through the bin.

A further object of the present invention is to provide a heating structure which can be removably inserted in a conventional bin discharge gate assembly to permit heating of fine portland cement components moving through the gate, the configuration of the structure taking into account the characteristic pattern of movement of the fine material through the bin.

These and other objects will become apparent as the description proceeds with reference to the accompanying drawings in which.

Figure 1:
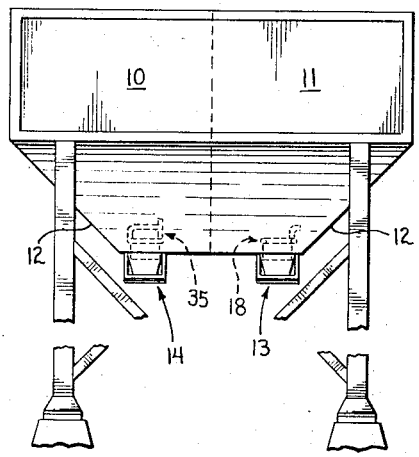
FIG. 1 is a side view of a conventional bin structure which includes both coarse aggregate and fine aggregate bins with the heating assemblies shown in place just above the conventional bin discharge gates.

Referring initially to FIG. 1, there is shown a conventional bin structure which may include a coarse aggregate bin 10 and a fine aggregate bin 11, having inclined lower side portions 12 and discharging through identical bin discharge gates indicated generally at 13 and 14.

Figure 2:
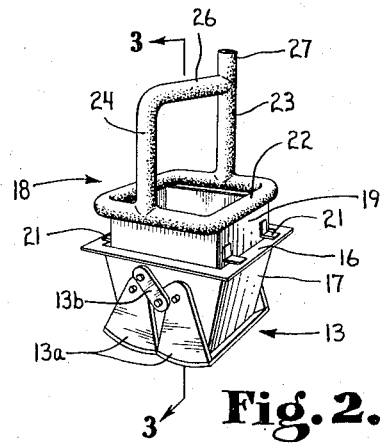
FIG. 2 is a perspective view of the fine aggregate heater assembly shown mounted upon a conventional bin discharge gate.

As may best be seen in FIG. 2, the bin discharge gate 13 has a body 17 of generally rectangular cross-section. The sides of the body 17 are tapered inwardly somewhat and its upper margin is outwardly flanged as indicated at 16 in FIG. 2 to facilitate attachment of the gate to the bin area defining the discharge opening.

Figure 3:
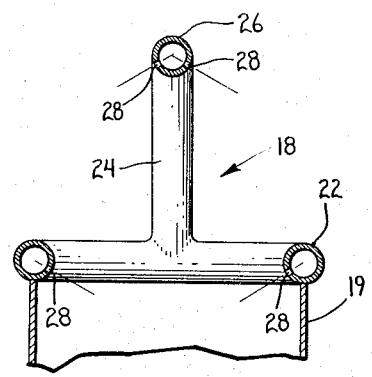
FIG. 3 is a sectional view of the fine aggregate heater assembly taken generally along the line 3—3 of FIG. 2.
Figure 5:
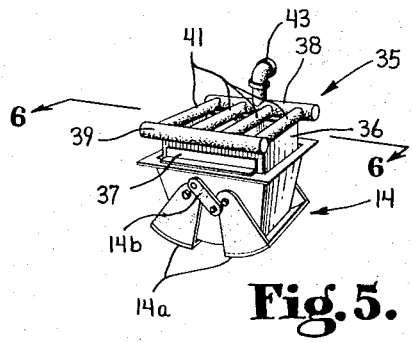
FIG. 5 is a perspective view, similar to FIG. 2, but showing the coarse aggregate heater assembly in place on a conventional bin discharge gate.

As may best be seen in FIGS. 2 and 3, the bin discharge gates 13 and 14 are provided with gate closure members 13a and 14a which are pivoted on stub shafts extending from the sides of the gates, and provided with a mechanical linkage 13b and 14b. Actuation of the linkage by, for example, a hydraulic cylinder actuator, serves to move the gate closure members across the open lower end of the gate body toward and away from a transverse axis bisecting the area enclosed by the lower end of the gate. Thus, when the actuator has moved the linkage so as to separate the closure members relatively widely, as illustrated in FIG. 5, the discharge gate will be open and material will move from the bin through the gate into a batching scale or a conveyance (not shown). When the closure members are moved toward each other so as to touch at the axis referred to above, as shown in FIG. 2, the bin discharge gate will be closed. It should be noted that no matter what the distance separating the gate closure members, whether it be relatively small or relatively large, the material moving towards the gate opening will move in a path vertically above and approaching the central axis, referred to above, toward and away from which the gates move.

The bin structure and the discharge gates described above are of conventional structure. The fine aggregate heater assembly, embodying the present invention, will now be described with reference to FIGS. 2, 3, and 4. The fine aggregate heater assembly is indicated generally at 18 in FIG. 2 and comprises a rectangular frame 19, sized so as to be insertable within the open, upper end of the gate body as shown in FIG. 2. Opposite sides of the frame are provided with brackets 21 which define the depth of insertion of the frame within the gate. A steam type grid structure is carried by the frame and comprises a base tube 22 formed in a closed rectangular configuration generally coextensive with the rectangular upper end of the gate body. Extending upwardly from opposite end sections of the base tube are upright tubes 23 and 24 which, of course, communicate with the interior of the base tube. A bridging tube 26 joins the upper ends of the upright tubes and extends parallel to and vertically above the transverse axis toward and away from which the gate closure members 13a move as the gate is opened and closed. One of the tubes is adapted, as shown at 27 in FIG. 2, to receive steam applied thereto for distribution within the tubes making up the grid structure. As may best be seen in FIG. 3, the base tube and the bridging tube are provided with steam discharge apertures 28 spaced at intervals along the tubes. Steam discharge openings one quarter inch in diameter are known to work satisfactorily, although the precise size of these discharge openings is not critical. The total number of the steam discharge apertures is such that the sum of their areas is slightly less than the cross-sectional area of the steam supply pipe so as to assure even distribution of steam within the grid.

Figure 4:
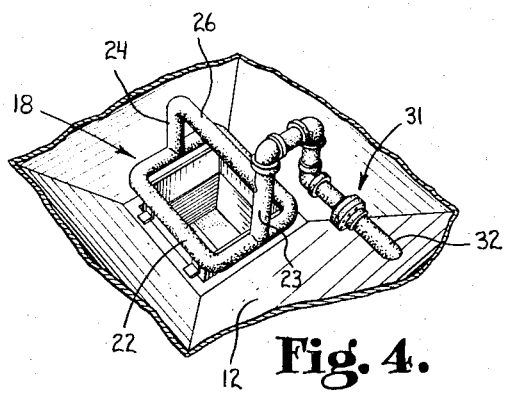
FIG. 4 is a perspective view of the interior of an emptied fine aggregate bin showing the fine aggregate heater assembly in place within the bin.

The fine aggregate heater 18 is mounted within the bin as illustrated in FIG. 4. A flange union, indicated at 31, may be utilized to join the heater assembly to a permanently located steam supply pipe 32 in the bin. During warm weather, or when the heater assembly is not needed, it may be removed from the bin and the steam supply pipe capped.

In operation, the gate linkage 13b is conventionally actuated by a hydraulic cylinder actuator, the pressure to which is controlled by an electrically operated solenoid valve. A solenoid valve may also be used to control the entry of steam into the steam supply pipe 32 (FIG. 4) and this steam supply solenoid may be connected in parallel with the electrical device controlling the opening of the gate closure members. Thus, whenever the gate closure members are moved to open position, steam is admitted to the grid structure of the heating assembly 18. No matter how widely or narrowly the closure members are separated, the fine aggregate will move through the bin in a stream which sweeps the bridging tube 26 and which moves between the side portions of the base tube structure 22. During such movement, steam will enter the material raising its temperature and its moisture content. The temperature and moisture content of the material leaving the bin may be controlled by varying the degree of opening of the closure members 13a. Thus if the temperature and moisture content of the material is to be increased substantially, the closure members may be opened or separated by a relatively narrow distance, thus increasing the time necessary to move a unit amount of material through the gate and thereby increasing its temperature and moisture content. The location of the bridging tube 26 vertically above the line of separation of the closure members 13a is an important structural feature since it assures that the fine material moving toward the gate will always sweep the bridging tube 26 no matter how widely or narrowly the discharge gate is opened. It should further be noted that the configuration of the fine aggregate heater, with a single tube 26 extending across the path of movement of the material to the gate, minimizes or eliminates any tendency of the fine material to "arch" across the gate.

Figure 6:
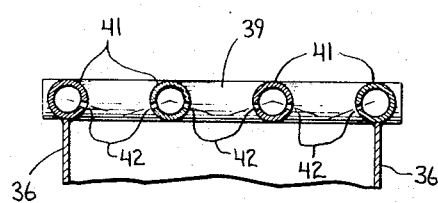
FIG. 6 is a sectional view of the coarse aggregate heater assembly taken generally along the line 6—6 of FIG. 5.

The coarse aggregate heater assembly will now be described with particular reference to FIGS. 5 and 6. The coarse aggregate heater assembly, identified generally at 35 in FIG. 5, includes a rectangular frame 36 adapted for removable insertion into the open end of the body of the gate 14 by means of the brackets 37 carried by the frame and defining the depth of insertion of the frame into the gate body. Welded or otherwise rigidly secured to the frame 36 is a grid structure which comprises two parallel header tubes 38 and 39. Spaced, parallel transverse tubes 41 extend between the header tubes and, as will be evident from FIG. 5, the extension of the transverse tubes 41 is parallel to the transverse axis defining the terminus of motion of the gate closure members 14a. The spacing between the transverse tubes 41 is preferably a distance slightly greater than the maximum dimension of the granules of material within the coarse aggregate storage bin so that even the largest granule can freely pass between the transverse tubes 41. The spacing is limited to only slightly greater than the maximum dimension of the largest granules so that maximum contact is maintained between the aggregate particles and the tubes as the material moves past the tubes. As may best be seen in FIG. 6, the transverse tubes are provided with a series of spaced, steam discharge apertures 42. The outer pair of transverse tubes 41 carry a single row of discharge apertures 42 while the inner pair of transverse tubes carry two rows each of steam discharge apertures. One of the header tubes, tube 38, is adapted to receive steam from a steam supply pipe (not shown) as indicated at 43 in FIG. 5.

In operation the coarse aggregate heater assembly 35 is placed on the gate frame as shown in FIG. 5, the assembly 35 being oriented within the coarse aggregate bin in the same fashion as the fine aggregate heater is arranged within the fine aggregate bin as illustrated in FIG. 4. As previously mentioned with respect to the fine aggregate heater assembly, the heater assembly 35 may have its steam supply controlled by a solenoid valve which is energized whenever the actuator for moving and holding the closure members 14a in open position is energized. Since coarse aggregate appears to move generally vertically within the bin until it contacts the inclined sides of the lower portion of the bin, as compared to the relatively vertical column movement of fine aggregate, when the closure members 14a are opened, coarse aggregate will move between the transverse tubes 41 and will be heated by steam issuing from the steam discharge apertures.

From the foregoing it will be evident that the structure described may be conveniently installed in or removed from conventional storage bins, and that regulation of the amount of heat transferred to the material moving through the bin discharge gates may be regulated by controlling the size of the gate opening since the admission of steam to the aggregate heater occurs whenever the appropriate discharge gate is opened. If pieces of coagulated, frozen material become lodged above the heater during extremely cold weather, these may be thawed by independently energizing the steam supply pipe controlling valve while leaving the discharge gate closed for a short period. While automatic electrical, simultaneous operation of the gates and the steam supply valves have been referred to, it will be understood that on smaller installations, manually operable valves might be utilized to control the admission of steam to the heaters with the opening of the appropriate bin gate. Other supplemental heating systems for the concrete can, of course, also be used in extremely cold weather, however, these would be complementary to the heating system disclosed herein. It should be particularly noted with respect to the method of heating the concrete ingredients described herein that no attempt is made to heat the entire contents of the bins but only that material which is about to flow from the discharge gate is heated.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An assembly for heating granular material moving out of a bin, said assembly comprising a bin discharge gate of the type having a body of generally rectangular cross-section, gate closure members movable across one end of the gate body toward and away from a transverse axis bisecting the area enclosed by said one end of the gate body, said assembly comprising a rectangular frame adapted to be removably inserted into the other end of said gate body, a grid structure carried by said frame comprising two parallel header tubes with parallel transverse tubes extending between said header tubes, one of said header tubes being adapted to receive steam applied thereto, said transverse tubes extending parallel to said transverse axis defining the terminus of motion of said gate closure members and being spaced from each other a distance slightly greater than the maximum dimension of granules within the bin, said transverse tubes having steam discharge apertures spaced along the length thereof, whereby the material in the bin moving toward the discharge gate sweeps said transverse tubes and is heated by steam issuing from said steam apertures.

2. An assembly for heating granular material moving out of a bin, said assembly comprising a bin discharge gate of the type having a body of generally rectangular cross-section, gate closure members movable across one end of the gate body toward and away from a transverse axis bisecting the area enclosed by said one end of the gate body, said assembly including a grid structure disposed above and adjacent to the other end of said gate body and comprising two parallell header tubes with parallel transverse tubes extending between said header tubes, one of said header tubes being adapted to receive steam applied thereto, said transverse tubes extending parallel to said transverse axis defining the terminus of motion of said gate closure members and being spaced from each other a distance slightly greater than the maximum dimension of granules within the bin, said transverse tubes having steam discharge apertures spaced along the length thereof, whereby the material in the bin moving toward the discharge gate sweeps said transverse tubes and is heated by steam issuing from said steam apertures.

3. An assembly for heating fine material moving out of a bin, said assembly comprising a bin discharge gate of the type having a body of generally rectangular cross-section, gate closure members movable across one end of the gate body toward and away from a transverse axis bisecting the area enclosed by said one end of the gate body, said assembly comprising a rectangular frame adapted to be removably inserted into the other end of said gate body, a grid structure carried by said frame comprising a base tube formed in closed rectangular configuration generally coextensive with said frame, an upright tube communicating with the interior of said base tube extending upwardly from each of two opposite side portions of the base tube, a bridging tube joining the ends of said upright tubes and extending parallel to and vertically above said transverse axis defining the terminus of motion of said gate closure members, one of said tubes being adapted to receive steam applied thereto for distribution within said grid structure, said base tube and said bridging tube having steam discharge apertures therein, whereby independently of the distance separating said gate closure members the material in the bin moving toward the discharge gate sweeps said bridging tube and is heated by steam issuing from said bridging tube and said base tube apertures.

4. An assembly for heating fine material moving out of a bin, said assembly comprising a bin discharge gate of the type having a body of generally rectangular cross-section, gate closure members movable across one end of the gate body toward and away from a transverse axis bisecting the area enclosed by said one end of the gate body, said assembly including a grid structure disposed above and adjacent to the other end of said gate body and comprising a base tube formed in closed rectangular configuration generally coextensive with said gate body cross-section, an upright tube communicating with the interior of said base tube extending upwardly from each of two opposite side portions of the base tube, a bridging tube joining the ends of said upright tubes and extending parallel to and vertically above said transverse axis defining the terminus of motion of said gate closure members, one of said tubes being adapted to receive steam applied thereto for distribution within said grid structure, said base tube and said bridging tube having steam discharge apertures therein, whereby independently of the distance separating said gate closure members the material in the bin moving toward the discharge gate sweeps said bridging tube and is heated by steam issuing from said bridging tube and said base tube apertures.

5. An assembly for heating fine material moving out of a bin, said assembly comprising a bin discharge gate of the type having a body of generally rectangular cross-section, gate closure members movable across one end of the gate body toward and away from a transverse axis bisecting the area enclosed by said one end of the gate body, said assembly including a grid structure disposed above and adjacent to the other end of said gate body, said grid structure including tubes extending parallel to said transverse axis defining the terminus of motion of said gate closure members, one of said tubes being adapted to receive steam applied thereto for distribution within said grid structure, said tubes having steam discharge apertures therein, whereby the material in the bin moving toward the discharge gate sweeps said tubes and is heated by steam issuing from said tube apertures.

References Cited

UNITED STATES PATENTS

| | | | |
|---|---|---|---|
| 129,018 | 7/1872 | Fisher | 34—37 X |
| 1,687,227 | 10/1928 | Powell. | |
| 2,703,936 | 3/1955 | Hut | 34—168 |
| 2,746,733 | 5/1956 | Edgerton | 259—147 |

FREDERICK L. MATTESON, Jr., *Primary Examiner.*

D. A. TAMBURRO, J. J. CAMBY, *Assistant Examiners.*